US009156185B2

(12) United States Patent
Bendiktsen et al.

(10) Patent No.: US 9,156,185 B2
(45) Date of Patent: Oct. 13, 2015

(54) APPARATUS AND OPERATING SYSTEMS FOR MANUFACTURING IMPREGNATED WOOD

(75) Inventors: Rune Bendiktsen, Skien (NO); Morten Eilertsen, Skien (NO); Per Brynildsen, Porsgrunn (NO)

(73) Assignee: Kebony ASA (NO)

( * ) Notice: Subject to any disclaimer, the term of this patent is extended or adjusted under 35 U.S.C. 154(b) by 721 days.

(21) Appl. No.: 13/263,710

(22) PCT Filed: Apr. 9, 2010

(86) PCT No.: PCT/IB2010/000991
§ 371 (c)(1),
(2), (4) Date: Dec. 16, 2011

(87) PCT Pub. No.: WO2010/116262
PCT Pub. Date: Oct. 14, 2010

(65) Prior Publication Data
US 2012/0101620 A1     Apr. 26, 2012

(30) Foreign Application Priority Data
Apr. 9, 2009   (GB) .................................. 0906146.6

(51) Int. Cl.
*G05D 23/19* (2006.01)
*G05B 13/02* (2006.01)
(Continued)

(52) U.S. Cl.
CPC . *B27K 5/04* (2013.01); *B27K 3/025* (2013.01); *F26B 5/04* (2013.01); *F26B 21/06* (2013.01); *F26B 25/225* (2013.01); *G05D 27/02* (2013.01); *B27K 3/156* (2013.01); *F26B 2210/16* (2013.01)

(58) Field of Classification Search
CPC .................................................. B29K 2105/06
USPC ....................................................... 700/109
See application file for complete search history.

(56) References Cited

U.S. PATENT DOCUMENTS 2,313,953 A    3/1943  Loughborough et al.
2,909,450 A   10/1959  Goldstein et al.
(Continued)

FOREIGN PATENT DOCUMENTS

EP    1341648    8/2004
EP    1368167   10/2004
(Continued)

OTHER PUBLICATIONS

Militz H. "Treatment of Timber with Water Soluble Dimethylol Resins to Improve their Dimensional Stability and Durability" Wood Science and Technology, Springer Verlag, Berlin, DE LNKD-DOI-10.1007/BF00192221, vol. 27, Jan. 1, 1993, pp. 347-355, XP009025114, ISSN: 0043-7719.
(Continued)

*Primary Examiner* — Mohammad Ali
*Assistant Examiner* — John Park
(74) *Attorney, Agent, or Firm* — Workman Nydegger (57) ABSTRACT

Furfurylated wood produced in a two-chamber system in which monomer/oligomer impregnation in an impregnation chamber is followed by successive stages of drying and curing. Physical properties of wood under treatment are measured, recorded and referenced into a database that accumulates wood species data relating to applied temperature and pressure profiles, physical properties and appearance of intermediate and finished samples of wood and also chemical treatment regimes, including soak time and monomer/oligomer concentrations. During drying and curing, monitoring of process parameters, including water removal and/or atmospheric conditions, are used by a controller both to control and determine a state of process completion by comparing recorded data with historically accumulated data or process set point conditions. Physical and/or chemical attributes of finally processed wood are used in an automated control loop to modify, reactively or in real time, applied treatment regimes for specific wood species and wood profiles.

15 Claims, 7 Drawing Sheets

(51) Int. Cl.
*B27K 5/04* (2006.01)
*B27K 3/02* (2006.01)
*F26B 5/04* (2006.01)
*F26B 21/06* (2006.01)
*F26B 25/22* (2006.01)
*G05D 27/02* (2006.01)
*B27K 3/15* (2006.01)

(56) References Cited

U.S. PATENT DOCUMENTS

| | | | |
|---|---|---|---|
| 2,947,648 A | | 8/1960 | Sonnabend et al. |
| 3,622,380 A | | 11/1971 | Williams |
| 4,496,697 A | * | 1/1985 | Zsolnay et al. ............ 526/60 |
| 5,032,525 A | * | 7/1991 | Lee et al. ................ 436/55 |
| 5,512,098 A | | 4/1996 | French et al. |
| 6,170,212 B1 | | 1/2001 | Suchyna et al. |
| 6,318,794 B1 | | 11/2001 | Berube |
| 7,578,251 B1 | | 8/2009 | Gribble |
| 2003/0186035 A1 | | 10/2003 | Cruce et al. |
| 2004/0028933 A1 | | 2/2004 | Schneider |
| 2004/0091727 A1 | | 5/2004 | Schneider |
| 2006/0154100 A1 | | 7/2006 | Holcomb |
| 2006/0155049 A1 | | 7/2006 | I'Abee et al. |
| 2008/0220277 A1 | | 9/2008 | Kingma |
| 2009/0197036 A1 | | 8/2009 | Hwang et al. |

FOREIGN PATENT DOCUMENTS

| | | |
|---|---|---|
| GB | 1416428 | 2/1972 |
| JP | 2007/320199 | 12/2007 |
| WO | 8800114 | 1/1988 |
| WO | 0230638 | 4/2002 |
| WO | 02/43933 | 6/2002 |
| WO | 02060660 | 8/2002 |
| WO | 2004011214 | 2/2004 |
| WO | 2004011216 | 2/2004 |

OTHER PUBLICATIONS

International Search Report from PCT/IB2010/000991completed Sep. 16, 2010.
UK Search Report from Application No. GB0906146.6 completed May 27, 2009.
Militz H: "Treatment of Timber with Water Soluble Dirnethylol Resins to Improve their Dimensional Stability and Durability" Wood Science and Technology, Springer Verlag, Berlin, De Lnkd-DOI:10.1007/BF00192221, vol. 27, Jan. 1, 1993, pp. 347-355, XP009025114 ISSN: 0043-7719.
U.S. Appl. No. 13/264,663, filed Dec. 20, 2011, Westin et al.
International Search Report from PCT/EP2010/055467 completed Sep. 20, 2010.
Wan, et al., "Effect of Impregnation and In-Situ Polymerization of Methacrylates of Hardness of Sugar Maple Wood."
Green, et al., "Mechanical Properties of Wood."
Zhang, et al., "Water Vapor Adsorption and Volumetric Swelling of Melt-Impregnated Wood-Polymer Composites."
UK Search Report from Application No. GB0906989.9 completed Jul. 15, 2009.
U.S. Appl. No. 13/264,663, Mar. 28, 2013, Restriction Requirement.
U.S. Appl. No. 13/264,663, May 9, 2013, Office Action.
U.S. Appl. No. 13/264,663, Nov. 22, 2013, Final Office Action.
U.S. Appl. No. 13/264,663 Sep. 11, 2014, Office Action.
U.S. Appl. No. 13/264,663, Aug. 13, 2015, Final Office Action.

* cited by examiner

APPARATUS AND OPERATING SYSTEMS FOR MANUFACTURING IMPREGNATED WOOD

FIELD OF THE INVENTION

This invention relates, in general, to a method of manufacturing impregnated wood and wooden articles and is particularly, but not exclusively, applicable to apparatus and process control techniques used in the production of polymer modified wood, such as furan polymer impregnated sap woods and products obtained by the process.

RELATED APPLICATIONS

The present application is a U.S. Nationalization of PCT Application Number PCT/IB2010/000991 filed Apr. 9, 2010 which claims priority to UK patent application No 0906146.6 filed Apr. 9, 2009, which relates to co-pending UK patent applications Nos 0906207.6 and 0906197.9 relating to a preferred chemistry for the treatment of impregnated wood. The subject matter in these co-pending applications is incorporated by reference in the present application for all purposes.

BACKGROUND OF THE INVENTION

Demand for hardwoods and their slow-growing nature have contributed to deforestation and produced related long-term ecological and environment problems. For example, tropical rain forests (a nursery for hard woods) are being stripped away at an annual rate of about 80,000 km$^2$ to 100,000 km$^2$. Such wholesale deforestation adversely affects plant and animal diversity and is believed to contribute about 20% of the world's greenhouse gas emissions. These environmental considerations mean that hardwoods are becoming more expensive.

Freshly felled timber has a considerable moisture content present as 'free' moisture within the cell cavities and 'bound' or 'combined' moisture saturating the cell walls. The freshly sawn lumber will typically lose about 50% of its total weight, shrink somewhat and become much stronger, harder and more durable during the subsequent seasoning [drying and stabilising] process. The seasoning process also improves timber workability and the bonding of adhesives and surface finishes. In the drying process the wood first loses the free moisture to reach the 'fibre saturation point' (FSP) where no moisture is contained in the cell cavities, but the cell walls are still saturated with bound moisture. The FSP occurs at 30-35% moisture content in hardwoods and 25-30% moisture content in softwoods. Timber does not shrink during drying until the FSP is reached then it begins to shrink at a roughly proportionate rate until equilibrium moisture content is attained.

A first form of wood modification the thermal was treatment of timber. In the "Feuchte, Warme and Druck" (FWD) process discussed by Burmester (circa 1973), there was controlled pyrolysis, i.e. degradation through the use of heat, of the wood at temperatures in excess of 180° C. While this heat treatment process provided an improvement in dimensional stability of between about 50% to 90%, bending strength was reduced by 30%. High temperatures induce strain in wood that can increase cracking or splitting.

As an alternative to pyrolysis, oil heat treatments have been carried out at temperatures greater than 180° C., but in low oxygen conditions. In the process executed by Menz Holz, the desired temperature was maintained for between 2 and 4 hours. Strength was reduced by ~30%, although dimensional stability increased by ~40%.

Chemical modification techniques include:
i) Etherification: Etherification is achieved from a reaction with carboxylic acids or acid anhydrides commonly acetylation and furfurylation;
ii) Dimethylol Dihydroxyl Ethylene Urea ("DMDHEU") treatment;
iii) Reactive Oil Treatments; and
iv) Hydrophobation.

In acetylation, impregnation is followed by heating to about 70° C. Acetic acid and unused anhydride have to be removed. Dimensional stability in the acetylated wood seemingly increases by ~+75%, but there is only a moderate increase in hardness and strength is not influenced very much. Wood colour does not change in acetylation. However acetylated wood stains badly when exposed to the environment. Growth of mould is a particular problem.

Dimethylol Dihydroxyl Ethylene Urea (DMDHEU) can be used in the treatment of wood. However, use of DMDHEU produces volatiles including formaldehyde.

In reactive oil treatments, modified linseed oil effectively provides a maleic acid anhydride group. The process can uses modified existing creosote equipment.

The hydrophobation process changes the cell wall from hydrophilic to hydrophobic to improve the behaviour of the wood in wet conditions. There are a variety of chemical techniques, including the use of silanes, siloxanes and silicones, melamine and the so-called "Royal Process" in which curing is performed by a hot oil treatment and wherein biocides are added. The addition of any toxic component is undesirable because recycling of the wood requires that these toxic chemicals can be removed to prevent their entry into the environment.

Production of furan polymer modified wood has been described by M. Schneider, M. Westin and others. Water removal has been achieved by traditional kiln drying of the wood after the formation of the furan polymer in the wood tissue. Unfortunately elevated temperatures in any final drying step (as with other high temperature drying steps described in alternative processes) often induce a tensile strain in the modified wood, which strain leads to unacceptable cracking and deformation and, more generally, reduced quality. Avoiding such drying-induced strain is especially important in hardwoods, such as beech, ash and maple.

The diversity and generally enhanced properties produced by the chemical processes make their products more attractive. Specifically, the ability to replicate the properties of hardwoods using chemical processes is particularly advantageous when contrasted with those from the thermal and oil treatment processes. However, while some of these chemicals act for example to preserve the modified wood, they have detrimental effects. For example copper chromium arsenate proved to be a popular preservative, but chromium and arsenic are toxic. Also impregnating solutions that are prepared by chemical processes in complex resinmaking plants are expensive.

Furfurylation produces a modified wood having a high dimensional stability, high durability and high resistance to acid and alkali. Furfuryl alcohol (FFA) monomer is impregnated into the cells and subsequently polymerized by aqueous solutions. FFA is produced from hydrolysed biomass waste, e.g. molasses. FFA produces a highly branched cross-linked furan polymer grafted to the cell walls. Westin has explained the many ways that this molecule polymerises and of particular note is that FFA forms covalent bonds with lignin. Furfurylation marginally reduces the impact strength of the timber because the timber becomes harder and more brittle, but this is more than offset by the increased stiffness (of between 30% to 80%), increased dimensional stability (of between about 30% to 80%) and increased durability, i.e. resistance to insect and mould attack. Moreover, the impregnation of wood with furan-based polymers is advantageous in that the modified wood does not emit toxic substances either during the manufacturing phase or during the lifetime of the product.

For example, one of the processes employed to date to produce modified wood using FFA requires:

1. The furfuryl alcohol (FFA) to be mixed with water, catalyst and buffer and stored prior to use in a buffer tank. Since there has been a tendency for separation of the FFA from the water and the resultant mixture to have a short shelf-life, stabilisers e.g., borax have been added.
2. The wood to be placed in an autoclave, the mixture introduced and an over-pressure applied to impregnate the wood with the solution.
3. Then the wood is cured using a heating process. The application of heat causes the polymerisation to proceed at a meaningful pace. Unfortunately the greater the heat applied, the more detrimental is the effect on the wood. Also, different species of woods react differently to the application of high temperatures. Soft woods are better able to cope with aggressive heat treatment regimes. While reactants can be selected to effect curing at moderate temperatures as well as at high temperatures, reaction rates will differ accordingly.
4. After curing the wood is then dried in a kiln at which point any remaining volatiles and unreacted mixture are expelled to leave the wood dry and ready for the market. Following curing, the level of volatiles left in the wood is generally very low, i.e. less than 0.1% of the reactants, and these chemicals are generally qualified as being safe and suitable to remain within the modified wood.

It is also known to react the base monomer FFA in two alternative ways: i) to produce a pre-polymer or oligomer; and ii) to add to the furan ring by producing a pre-polymer made by reacting furfuryl alcohol, formaldehyde and adipic acid. By reacting FFA with formaldehyde, a portion of the monomer is converted into bismethanofuran to produce a resultant mixture that is more reactive than pure FFA Maleic anhydride is added to the mixture as a polymerization catalyst before it is impregnated into the wood. Heat causes the mixture to polymerize in the wood. Curing is achieved at a temperature of between 70° C. and 200° C.

U.S. Pat. No. 2,947,648 discloses the use of FFA, maleic anhydride and water or alcohols as diluents, while sulphur dioxide is used as a penetrator/catalyst. An initiator must be added to the mixture. Gaseous sulfur dioxide catalyst is added to the product in a container after the mixture has been impregnated in a previous step. The mixture must have a low viscosity to penetrate wood. Water, methanol or ethanol can be used as a diluent. Uniformly treated, lumber-sized wood products are unlikely to result from this method because of limited gas penetration. The process also suffers from off-gasing of sulphur compounds and unreacted FA.

U.S. Pat. No. 2,909,450 discloses use of FFA, water and dibasic or tri basic organic acids. Water is used to dissolve a zinc chloride catalyst. While this mixture can be effective for thin timber samples, it does not easily penetrate lumber-sized samples. This leads to a multi-stage approach in which a $ZnCl_2$ solution is firstly applied and allowed to dry, whereafter a second uncatalyzed FFA is applied to achieve enhanced distribution of reactant within the lumber. $ZnCl_2$ has a high affinity for wood and therefore it is retained in the top layers of the impregnated material which, upon curing, leads to an egg-shell impregnation that leaves the core of the wood unprotected. Furthermore, a colour gradient often develops in the wood affecting the overall aesthetic appearance. Finally, unreacted FFA has been observed to leach from the wood over time, which off-gasing presents an odour problem and commercial loss from wasted FA. More critical is that $ZnCl_2$ effects cellulose stability and therefore decreases the long-term strength of the modified wood.

WO 02/043933 discloses use of FFA, water and maleic acid as a catalyst.

U.S. Pat. No. 2,313,953 discloses the need for a buffer to stop the catalysts acting prematurely in a wood treatment process. Use of borax is disclosed.

U.S. Pat. No. 3,622,380 is restricted to the production of veneers. Atmospheric pressure soaking is used exclusively. The formulation is FFA, water, various metal salts to get different shades of color and a complexing agent.

Furfurylation techniques were developed by Schneider. In a first technique wood was impregnated with furfuryl alcohol and at least one other catalyst selected from maleic acid/anhydride, phtalic acid/anhydride, and stearic acid. These catalysts have similar affinity to wood as furfuryl alcohol and therefore penetrate wood at a similar rate. The impregnation solution was prepared by dissolving 5% to 20% of the catalyst in pure FA. Lower catalyst concentrations have longer storage life, but cure more slowly. Impregnation was carried out by a full-cell process. Wood samples were exposed to vacuum for 5 to 30 minutes and then a high pressure of 1 to 20 atmospheres for 20 to 60 minutes. The impregnated wood was then cured by stream, hot air, hot oil or high frequency (microwave) radiation in either: a) a one stage heating process at 140° C.; or b) a two stage heating process at 90° C. and then 140° C. Curing lasted for between 0.5 and 12 hours, with the 140° C. profile maintained for at least 1 hour to drive off uncured monomers and polymerization by-products. To avoid burning/charring of the wood, an oxygen-free atmosphere could be used.

In EP-B-1368167, Schneider diluted the FFA impregnation solution with water. The addition of water resulted in a two phase formulation and borax and sodium salts of ligno-sulfonic acids were added as stabilizers.

While heart wood has a better innate microbiological resistance due to its higher content of natural resins, these same resins inhibit the impregnation of the mixture into the heart wood. While FA can generally migrate into the heart wood, the migration of maleic acid or maleic anhydride is difficult. Consequently, FA may not be polymerized and it may leach out from the modified wood upon exposure to water.

In summary, most curing and drying methods in furfurylation techniques requires the use of elevated temperature that are generally detrimental to the overall treatment and conditioning of the wood. Elevated temperatures above about 140° C. and more particularly in excess of 150° C. alter the properties of the wood by damaging cell structures and by inducing internal strains that causes splitting or cracking of the wood; this is particularly true in the processing of hardwoods. Drying and curing are completed in successive and distinct steps in distinct chambers. Furthermore, acidic conditions, while considered necessary for polymerisation, affect shelf life of the mixture and can corrode reaction vessels. The use of volatile solvents, increases costs because of associated handling and re-cycling considerations.

SUMMARY OF THE INVENTION

According to a first aspect of the present invention there is provided a method of controlling production of chemically-impregnated wood, the method comprising: i) monitoring at least one of: a) an environment of a combined drying and curing chamber to determine changes in chemical out-gasing in that environment or water released from impregnated wood in that environment; and b) characteristics of polymerized wood that have been subjected to curing within the combined drying and curing chamber to determine changes in properties arising from differing processing conditions applied to different batches of chemically-impregnated wood; ii) altering processing conditions in at least the combined drying and curing chamber in response to determined changes, the processing conditions being selected from a group including at least one of: a) a temperature profile in at least the drying and curing chamber; b) a pressure profile in at least the drying and curing chamber; c) a set point trigger for a transition between impregnation and drying and drying and curing phases and phase completion; and d) a chemical composition of an impregnation solution used to produce the chemically-impregnated wood.

In a preferred embodiment, the method further comprises: i) against a batch identifier reflecting wood species type and dimensional parameters, recording: a) changes in the atmospheric environment arising with respect to time; b) changes in applied processing conditions arising over time with respect to different batches of wood; and c) differences in the characteristics in the polymerized wood from each batch; ii) selecting processing conditions for future batches of untreated wood by referencing desired characteristics for polymerized wood against historically accumulated processing conditions for similar wood species type and dimensional measures of the untreated wood.

In another aspect of the present invention there is provided a wood-treatment plant comprising: a combined drying and curing chamber arranged, in use, to treat chemically-impregnated wood at controlled pressures (and more usually at pressures initially below ambient pressure or at about ambient pressure); a monitoring sub-system coupled to the drying and curing chamber, the monitoring sub-system generating, in use, data reflecting at least one of: a) environment conditions in the combined drying and curing chamber; and b) characteristics of polymerized wood that has been subjected to curing within the combined drying and curing chamber; a database for storing data generated by the monitoring sub-system; and a controller coupled to the combined drying and curing chamber and the database, the controller exercising operational control over wood treatment processing in at least the combined drying and curing chamber in response to data from the monitoring sub-system, and wherein the controller is arranged, in use, to: i) identify with reference to stored or collated data in the database at least one of: a changes in chemical out-gasing in the combined drying and curing chamber or water derived from treatment of impregnated wood in the combined drying and curing chamber; b) changes in properties arising from differing processing conditions applied to different batches of chemically-impregnated wood; and ii) alter processing conditions in at least the combined drying and curing chamber in response to data from the monitoring sub-system, the processing conditions selected from a group including at least one of a) a temperature profile in at least the drying and curing chamber; b) a pressure profile in at least the drying and curing chamber; c) set point triggers for transitions between impregnation and drying and drying and curing phases and phase completion; and d) chemical compositions of impregnation solutions used to produce the chemically-impregnated wood.

In yet another aspect of the present invention there is provided a wood-polymerization process controller including an associated memory that stores wood treatment program code that, in use, is executed by the controller to: control temperature profiles in at least a combined drying and curing chamber; control pressure profiles in at least the combined drying and curing chamber; control set point triggers for transitions between at least one of impregnation and drying and drying and curing phases and phase completion; and control chemical compositions of impregnation solutions used to produce chemically-impregnated wood; the controller further arranged, in use, to identify with reference to stored data in the memory at least one of: a) changes in chemical out-gasing in the combined drying and curing chamber or water derived from treatment of impregnated wood in the combined drying and curing chamber; b) changes in properties arising from differing processing conditions applied to different batches of chemically-impregnated wood; and wherein the controller is arranged to execute code that alters processing conditions in at least the combined drying and curing chamber in response to interpretation of the stored data.

In a preferred embodiment, the wood-polymerization process controller executes, in use, code that is arranged: to assign and store a batch identifier reflecting wood species type and dimensional measures; to record changes in atmospheric environments within the drying and curing chamber arising with respect to time; to record changes in applied processing conditions arising over time with respect to different batches of wood; to record differences in characteristics in polymerized wood from each batch; and to select processing conditions for future batches of untreated wood by referencing desired characteristics for polymerized wood against historically accumulated processing conditions, stored in memory, for similar wood species type and dimensional measures of the untreated wood.

In certain embodiments, the controller typically operates to control pressures between about 0.1 bar and about ambient pressure In yet another aspect of the present invention there is provided a method of polymerizing monomer/oligomer-impregnated wood in a combined drying and curing chamber to produce a finished wood product having a desired moisture content, the method comprising: determining a take-up of impregnation solution and a relative moisture content within a batch of impregnated wood to be polymerized; initiating a drying phase under controlled pressure condition within the drying and curing chamber; monitoring at least one of water removal from the drying and curing chamber and an atmospheric environment in the drying and curing chamber; and transitioning to a curing phase at a process point prior to attaining the desired moisture content, the process point determined by at least one of the water removal and changing conditions in the atmospheric environment and wherein the curing phase requires a controlled increase in temperature in the combined drying and curing chamber over a predetermined period of time.

A preferred embodiment sees the transitioning from drying to curing occurring under controlled increases in both temperature and pressure.

In various preferred embodiments, transitioning to the curing phase from the (typically) reduced pressure (relative to atmospheric pressure) drying phase occurs at a moisture content level in the wood of between about 35% and 3%, more preferably between about 20% and 6% and most preferably at about 10%.

Typically, the predetermined time is about 4 hours.

In still yet another aspect of the present invention there is provided a wood impregnation plant including: an autoclave arranged to receive, in use, wood for impregnation with an impregnation solution containing a monomer or oligomer selected from furfuryl alcohol, bishydroxy methyl furan, trihydroxy methyl furan, oligomers and condensation products of these compounds or mixtures thereof; a storage buffer, including a temperature monitor, the storage buffer in fluid communication with the autoclave via a valve, the storage buffer arranged selectively to receive impregnation solution via the valve; a heat regulator associated with the storage buffer; and a controller coupled to the temperature monitor, the controller operational, in use, to effect regulation of the temperature of impregnation solution within the storage buffer by controlling the heat regulator.

Advantageously, the various aspects of the present invention provide, in isolation and combination, an improved system for producing and, more particularly, controlling the production of polymer impregnated wood (and more especially furfurylated wood) from a process involving the impregnation of a monomer or oligomer, selected from furfuryl alcohol, bishydroxymethyl furan, tris hydroxymethyl furan, oligomers and condensation products of these compounds and mixtures thereof, and the subsequent combined drying and curing of the resultant impregnated wood in a combined drying and curing vessel/stage. The preferred embodiments of the various aspects of the present invention permit dynamic and/or closed loop process control that supports efficiency gains in production and, additionally, refines the effectiveness of the furfurylation process for successive batches of timber deliveries to increase overall treated timber quality.

Use of the processes of the various aspects of the invention results in an overall improvement in the homogeneity of treatment between successive batches of wood and within individual batches of wood and greater control of moisture content at predetermined levels. Indeed, while it was previously understood that base impregnated monomers and oligomers would be removed along with moisture content during the drying phase to the detriment of the modified wood, it has been found that the curing and drying of the furan polymer modified wood can be more efficiently performed (in terms of energy and overall time) in a single pressure chamber equipped with adequate heating, vacuum and condensate handling systems.

Additional benefits arise from the ability to re-use the monomer or oligomer over an extended period of time to treat more batches of wood.

BRIEF DESCRIPTION OF THE DRAWINGS

Exemplary embodiments of the present invention will now be described by means of example but not in any limitative sense with reference to the accompanying drawings, of which:

FIGS. 3 (containing related FIGS. 3a to 3c) is a flow diagram of a preferred control protocol used by the impregnation sub-system of FIG. 1.

DETAILED DESCRIPTION OF A PREFERRED EMBODIMENT

Figure 1:
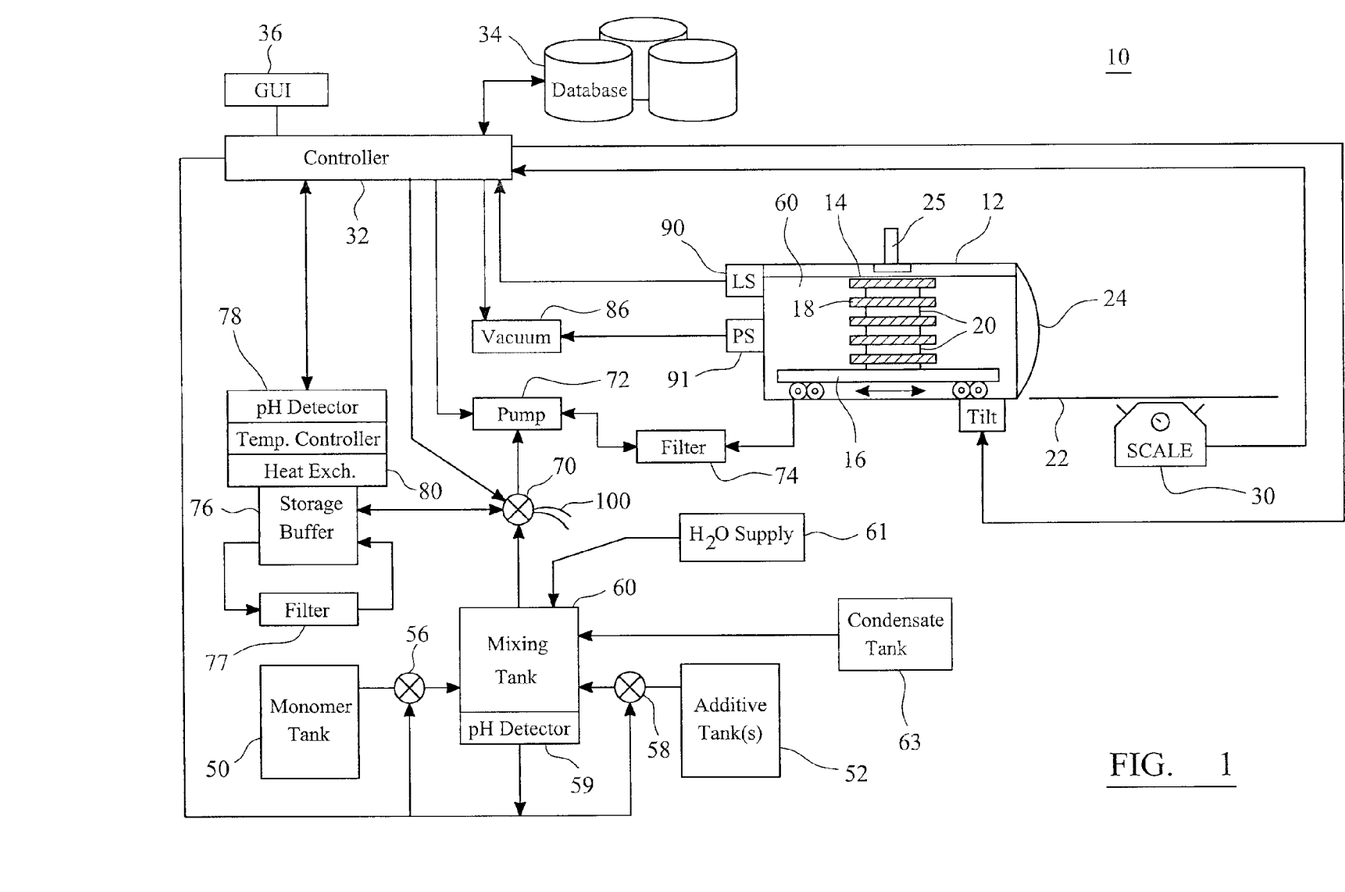
FIG. 1 is a block diagram of a preferred configuration of an impregnation sub-system used in the production of modified wood in accordance with one aspect of the present invention.

FIG. 1 shows a block diagram of a preferred configuration of an impregnation sub-system (10) used in the production of modified wood in accordance with one aspect of the present invention.

The impregnation sub-system (10) includes an autoclave (12) defining a sealable vessel in which a full-cell impregnation process is executed. Untreated wood or a quantity of wooden articles (of varying thicknesses and profiles) (14) is initially loaded onto a sled or pallet (16), the untreated wood (14) being generally arranged in layers (18) that are separated by supporting spacer elements (20). To facilitate the loading of untreated batches of wood into the autoclave (12), the sled (16) preferably includes runners or wheels (22) that engage into a track (not shown) or floor that extends along the base of the autoclave (12). To facilitate movement into and out of the autoclave (12), additional tracks (22) may also exist externally to the autoclave (12), which external tracks (22) align with the internal tracks or floor when the autoclave's door (24) is open. Should a wheeled sled be used, the sled (16) (and more particularly the wheels) is locked in place to prevent its movement during the impregnation process. To prevent the layers (18) from moving during the filling process, a weight or force is applied to the top of the stack of untreated wood, e.g. through the use of a hydraulic cylinder and piston (25). Of course, the stack could also be wired or clamped.

To assess an overall moisture content of a batch of untreated wood, the impregnation sub-system (10) may include some form of scale device (30) or load cell integrated within the sled (16). Many forms of scale exist and, indeed, individual pieces of untreated timber can be weighed and then summed. However, to avoid unloading and re-stacking of wood, it is preferred that a total weight of the batch be determined (at least) prior to the delivery of the batch into the autoclave (12). Typically, initial moisture contents in the untreated wood will be in the range of about 15% to about 30% by weight and sometimes higher. It is preferred that the moisture content of the untreated wood is always less than the fibre saturation point for the wood species.

Post-impregnation, the up-take of monomer into the batch is determined through a second weight measurement. The weight measurements are communicated to a system controller (32), typically realised by a computer, microprocessor or ASIC, and stored in a memory or database (34). The controller (32) includes a graphic-user interface (GUI) (36) permitting data entry and system control for a user thereof.

For commercial environments, the internal capacity of the autoclave (12) is typically up to about ~30 m$^3$ to about ~50 m$^3$. Consequently, a single delivery of a common wood species from a common source is likely to require the splitting of the stock into multiple batches that are successively impregnated over many cycles. The database (34) includes, over time, a listing of pressurised soak-times to achieve a given impregnation (monomer or oligomer take-up) for varying concentrations of monomer or oligomer. In this latter respect, the database reflects the fact that homogeneous impregnation is generally achieved through concentration rather than soak time and that processing time for a particular batch can therefore be inferred from historically-accumulated data.

The impregnation sub-system also includes a monomer (or oligomer) storage tank (50) and at least one additives tank (52) (and generally multiple additive storage vessels). It will of course be appreciated that the additives can be delivered into the system in a powder or liquid form and, consequently, these additives may be stored in a dry state and then dissolved before being temporarily stored in one or more dedicated tanks or containers. The storage tanks could, in fact, be realised by bulk delivery hoppers. The term "additive" should therefore not be considered to be limiting but rather encompassing to include powders, solutions and mixtures.

Additives to the monomer include buffering solutions (i.e. pH stabilizers) and catalysts or initiators. A mixing tank (54) is coupled to the monomer storage tank (50) and the additives tank(s) (52). Mixing in the mixing tank is regulated by the controlled operation of valves (56), (58) located between mixing tank (54) and the respective storage tank (50) and additives tank(s) (52). Valve is overseen by the controller (32). The mixing tank (54) may include a pH detector (59) coupled to the controller (32), whereby the controller (32) can control the pH of a mixed impregnation solution (60) to adjust reactivity and potency of the impregnation solution (60) as a trade-off against storage life. It has been recognised that, generally, a lower pH leads to a higher rate of polymerization in the subsequent curing phase. The pH is determined based on a trade-off between storage life and reactivity and, in this respect, it will be appreciated that high throughput in a commercial environment may allow for the use of lower pH and thus higher reactivity. Conversely, a lower throughput of wood may warrant a higher pH to permit longer-term storage life within the storage buffer (76).

As will be understood, each flow path may include one or more valve(s), although this is entirely dictated by design option.

The mixing tank (54) will also be coupled to a water supply (61) and, preferably, a condensate tank (63) that receives re-cycled condensate from the subsequent drying process (described subsequently).

When an acidic impregnation solution is used the autoclave may be made from a non-reactive material, such as stainless steel.

A multi-way valve (70) is located between the mixing tank (54) and the autoclave (12). The multi-way valve (70) can allow a flow pump (72) to direct freshly prepared impregnation solution (60) to the autoclave (12) via a cleaning filter (74). The flow pump (72) and multi-way valve operate under the control of the controller (32). In a preferred embodiment, the sub-system (10) includes a further storage buffer (76) that is arranged to receive the impregnation solution (60) from the mixing tank (thereby freeing up the mixing tank for the production of new solution) or otherwise to store re-cycled impregnation solution that is emptied from the vessel (12) (by the flow pump (72)) after the impregnation cycle has been completed. The exact location of the flow pump is merely a design option, as will be readily appreciated by the skilled addressee.

It will be understood that the multi-way valve is merely one example and that separate flow paths and controllable valves may be used within the system to direct flow. Similarly, a preferred embodiment makes use of one or more independently-controllable pumps within each flow path.

The storage buffer (76) includes a closed loop filter (77) that acts to filter particulate matter from stored impregnation solution (60). Additionally, the storage buffer (76) includes a pH detector/sensor (78) (coupled to the controller), a heat regulator (80) (such as a heat exchanger) that, under the control of the controller (32), advantageously regulates the heat within any stored impregnation solution (60) to prolong storage/usage life. Given a determined pH in the storage buffer (76), stabiliser solution can be added under the functional control of controller (32) and the controlled operation of the valves in the flow path to the relevant additive tank (52). Of course, local temperature control could be employed using a temperature controller in combination with the heat exchanger/heater (80).

A vacuum pump (86) is coupled to the autoclave (12), which vacuum pump 86 is under the operational control of the controller (32).

The autoclave (32) also includes a level sensor (90) that determines, in use, a level of impregnation solution (60) within the sealed autoclave (12). The level sensor (90) is operationally coupled to the controller (32) and permits the controller (32), as necessary, to increase the volume of impregnation solution (60) in the vessel to address take-up of the impregnation solution (60) by the untreated wood (14). In use, the level of impregnation solution (60) is above the uppermost surface of wood (14) on the sled (16).

Usually, the autoclave will be arranged in a "top-fill" configuration in which a secondary tank is located above the autoclave (12). The level sensor (90) is therefore, in a preferred embodiment, associated with this secondary tank. This top-fill configuration means that the autoclave is always, in use, totally filled with impregnation solution.

Optionally, a tilt device (94), such as a hydraulic ram, is located beneath the autoclave (12) to permit the autoclave (12) to be tilted (when empty of impregnation solution (60)). Tilting, under the control of the controller (32), permits impregnation solution (60) lying on the surface of the wood (14) to be run off.

In operation, once the wood is loaded and sealed within the autoclave (12), the controller (32) initially causes the vacuum pump (86) to produce a reduced pressure of about ~0.1 bars (i.e. 0.01 MPa) by removing air from within the autoclave (12). This reduced pressure encourages both the take-up of impregnation solution within the wood's cellular structure and the retention of impregnation solution within the wood. Pressure is measured by a pressure sensor (91) located within the sealed autoclave (12) and coupled to the controller (32). Impregnation solution (60) at a desired monomer/oligomer concentration and desired pH is then injected (under pump pressure) into the autoclave (12), the impregnation solution covering the wood and introduced to produce an over-pressure of about 10 to 12 bars (1 MPa to 1.2 MPa). Pressurised soaking of the wood is achieved at ambient temperature and over a time determined with reference to the database (34) of historically accumulated processing data, including at least one of wood species type, thickness, grain-cut orientation, monomer/oligomer concentration and pH, stacking configuration and the pressure or absence of heartwood.

Higher over pressures may be applied to accelerate the impregnation process, although the maximum pressure is limited to a pressure that is insufficient to cause the collapse of cell structures within the wood.

Once homogeneous impregnation has been assessed to have occurred, or deemed to have occurred, any remaining impregnation solution (including particulate contaminants) is returned, via the filter (74), pump (72) and valve system (e.g. the multi-way valve (70)), to the storage buffer (76) (or mixing tank in the event that no secondary storage tank exists) or otherwise sent to a drain point (100) for appropriate disposal (in the event that analysis of the returned liquor indicates that its properties cannot support processing of another batch). The filter (74) acts to remove particulate impurities.

When returned to storage buffer (76), a fraction of the returned liquor may be drained for disposal. For example, if some of the impregnation solution/liquor has undergone polymerization, its density increases so it will settle at the bottom of the storage buffer (76). Since the usefulness of polymerized liquor in the impregnation process is limited (relative to the monomer) and generally detrimental to the overall process, a preferred embodiment contemplates the separation and removal of such polymerized liquor through a controlled drainage process.

The door (24) of the autoclave (12) can then be opened and the take-up of monomer/oliomer measured by increased weight. Again, this weight is recorded in the database (34). If necessary, the wood (14) may be returned to the autoclave and re-soaked to address any perceived or observed deficiency in take-up weight or homogeneity. Having determined the take-up weight of monomer and the initial weight of the wood (as preferably also the moisture content of the untreated batch of wood (14)), a system operator can determine the amount of water to be removed in the subsequent process steps. Alternatively, the controller (32) can itself operate to calculate an end point for the total treatment process given these start and intermediate conditions/values.

Figure 2:
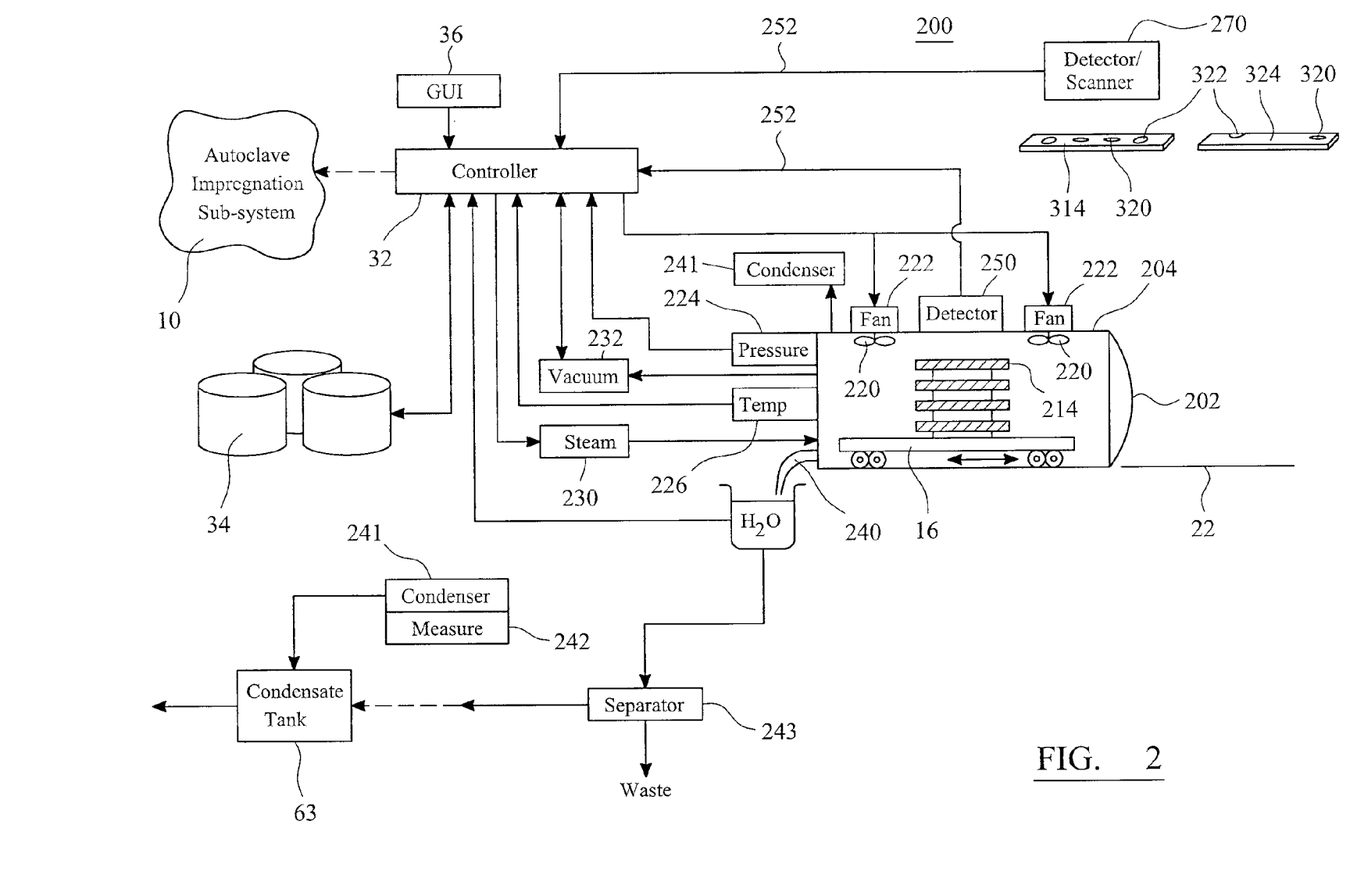
FIG. 2 is a block diagram of a preferred configuration of a drying and curing sub-system used in the production of modified wood in accordance with a second, independent but complementary aspect of the present invention.

Following impregnation, the sled or pallet (16) of now semi-treated wood (214) is subjected to additional treatment in drying and curing sub-system (200) (see FIG. 2). As will be understood, polymerization of the initially monomer impregnated wood can begin to occur at any time, although the rate of polymerization (and the building of effective long-chain molecules) occurs predominantly at curing and, to a minor extent, during drying (that occurs after monomer impregnation). For the avoidance of doubt, aspects of the invention that relate to drying and curing therefore operate to produce polymer impregnated wood from wood that is initially saturated or dosed with a predetermined amount of suitable monomer. More particularly, following impregnation, the wood impregnated (having the described chemistry and containing various amounts of water and monomer) is subjected to additional treatment in the form of heating and optionally variations in pressure. These variations in pressure and temperature are designed to serve two purposes: a) removal of water (drying) and b) speeding up the polymerisation (curing) of the low molecular monomer or oligomer of the impregnation solution.

In embodiments of the invention, temperature and pressure regimes can be arranged to facilitate drying followed by curing, curing and drying simultaneously or curing followed by drying. Drying before curing can be accomplished by subjecting the impregnated wood to reduced pressure, while keeping temperatures low enough to avoid rapid curing. Thereafter the pressure and temperature is raised to speed up curing. Curing and drying can be accomplished more or less simultaneously by raising the temperature and controlling the pressure. The rates of drying and curing can thus by controlled by selected combinations of temperature and pressure. The drying phase is generally defined as the phase where water is removed, while the curing phase is where the rate of polymerisation is increased. However, there may still be some water removal taking place during the curing phase.

Removal of water (i.e. drying) can be achieved by raising the temperature (provided that the surrounding environment is not moisture saturated) and/or by reducing pressure. And it should be noted that curing is predominantly determined by temperature, so environments can exist in a drying phase where the rate of curing correspondingly increases.

In a similar fashion to FIG. 1, once a door (202) of the drying and curing chamber (204) is opened, the sled or pallet (16) can preferably be aligned with interior runners or paths that facilitate movement of the wood on the sled or pallet (16). Again, as appropriate, the sled may be locked in place within the drying and curing chamber (204). The sled (16) may be commonly used between the impregnation sub-system (10) and the drying and curing sub-system (200), although off-loading and re-loading of the semi-treated wood (214) be otherwise be required.

While the drying and curing sub-system (200) can be located in close proximity to the autoclave (102), this need not be the case. Also, while the drying and curing sub-system (200) preferably makes use of a controller (32) and GUI (36) that is common with the controller (32) of the impregnation sub-system (10), this is merely a preferred design option. It is preferably, however, that distinctly and physically separate controllers for the impregnation sub-system (10) and drying and curing sub-system (200) interact, with this achieved through a suitable network connection, e.g. a dedicated Ethernet connection or via a WAN or the like.

For illustrative purposes only, the drying and curing sub-system (200) of FIG. 2 is shown to have only a single drying and curing chamber (204). However, since the heating curing/process is generally slower than the impregnation process, throughput of treated wood (214) and economics may require that there are multiple instances of the drying and curing chamber (204) for each operational autoclave (12).

In relation to the drying and curing chamber (204), at least one fan (220) (and typically a plurality of fans) permits atmosphere within the drying and curing chamber (204) to driven/circulated. To avoid the possibility to explosion, the fan motor (222) is located externally from the drying and curing chamber (204). Operational control of the fan motor (222) is regulated by the controller (32). This is relevant because resistance to rotation varies with changing pressure and there is a desire to control overall atmosphere velocity and related convection effects.

The drying and curing chamber (204) furthermore includes a pressure sensor (224) and at least one temperature sensor (226). Preferably, multiple temperature sensors distributed throughout the drying and curing chamber (204) permit the measurement of temperature variations and allow appropriate correction. For reasons of (at least) redundancy, the drying and curing chamber will typically include at least two pressure sensors.

Data acquired from these sensors is communicated to the controller (32). It will of course be appreciated that the drying and curing chamber (204) will typically include multiple temperate sensors distributed throughout the chamber to determine temperature variations. From a redundancy perspective, the system will also include multiple pressure sensors.

To provide atmospheric control within the drying and curing chamber (204), a heat source (230) (typically realised by a steam source) and a vacuum pump (232) are operationally responsive to the controller (32). Process control will be described subsequently.

The drying and curing chamber (204) also includes a drain port (240) that permits so-called "bottom condensate" (realised by water, furfuryl alcohol, organic compounds and polymer) to be drawn out of the drying and curing chamber (204) during the heating phase and, to a lesser extent, the subsequent curing phase. However, the principle mechanism for removal of water and other chemicals (so-called "top condensate") is via a heat exchanger, such as condenser (241) that taps into the drying and curing chamber (204) towards its upper surface.

A measurement device (242) measures both the rate of collection (e.g. liters per hour) and absolute weight of at least the top condensate (and possibly also the bottom condensate). The measurement device provides this rate and weight data to the controller (32) to permit monitoring and/or control of the overall process. In-line detectors (e.g. concentration measurement devices, specific density devices and/or viscosity measurements devices) may optionally supplement data collection to permit analysis of the top condensate and the assessment of the state of the overall drying and curing processes.

Top condensate is then routed (typically through the appropriate use of pumps and valves rather than a gravity feed) to condensate tank (63) for re-use in the mixing tank (54). Bottom condensate is routed to a separator tank (243) that permits the separation of re-useable parts of the condensate from unusable, heavy density polymer. Thereafter, the re-useable parts are transferred to the condensate tank (63).

The drying and curing chamber (204) may, optionally, also include an atmospheric detector (250), e.g. a spectrometer, colorimeter or gas reaction tube (such as a "Dräger" tube). Output data (252) from the atmospheric detector, either based on an instantaneous reading or a rate of monitored rate of change, may be used to assess the state of the process, as will be described subsequently, which output data (252) may be provided to the controller (32) for operational control of a current or subsequent drying and curing process.

Such output data, as with all data acquired by the controller (32), is preferably cross-correlated against wood batch characteristics for use in determining, revising, optimising or inferring the timing of events or operational effects of particular control settings within the impregnation phase, the drying phase and/or the curing phase.

The drying and curing sub-system furthermore includes a quality inspection device (270), typically realised as an optical scanner or its functional equivalent, such as an x-ray based machine supporting x-ray analysis. The quality inspection device preferably makes quantitative and/or qualitative assessments of samples of finished (polymerised) wood (314), e.g. in relation to hardness, cracks (320), knots (322), colour (324) and homogeneity of the polymer through the section of the finished wood (314). Manual inspection and data entry of results is also contemplated. Consequently, the term quality inspection device is to be construed broadly. Data (272) from the quality inspection device (270) is preferably communicated or otherwise input into the controller (32) for process control purposes and to permit, if desired, the acceptance or rejection of a sample of finished wood (314).

In additional to inspection of post-cured polymerized samples, it is optionally contemplated that untreated (i.e. non-impregnated) wood samples may also be subjected to quantitative and/or qualitative assessment by scanning. The cataloguing of untreated samples can then be cross-referenced in a database to allow selection of a control process (by the controller) based on corresponding wood quality and wood type and finished properties for the sample following completion of the impregnation, drying and curing stages.

In terms of general operation of the drying and curing chamber (204), once the semi-treated wood (214) has been positioned within the chamber (204) and the door (202) sealed shut, a drying cycle commences. More particularly, the controller (32) and vacuum pump (232) cooperate to reduce the pressure in the chamber to effect evaporation of moisture from the semi-treated wood (214), thereby producing drying.

The pressure is typically reduced to about ~0.1 bar to about 0.4 bar (i.e. 0.01 MPa to 0.04 MPa), although the pressure could be taken lower. Moisture from the wood as well as heat in the form of super-heated steam from the heat source (230) are monitored and controlled by controller (32) to provide a heat conduction mechanism within the drying and curing chamber (204). During the drying phase, temperatures in the drying and curing chamber 204 are maintained below a point where curing of the monomer or oligomer occurs, e.g. below about 90° C. Pressure is therefore maintained by the presence of water molecules within the atmosphere of the drying and curing chamber (204).

Under the control of controller (32), fan speeds are regulated and controlled by controller (32) to compensate for low pressure conditions within the drying and curing chamber (204). Preferably, fan control also results in flow direction changes to be introduced into the drying and curing chamber (204) at regular intervals, e.g. about every 30 minutes.

In contrast with prior art systems that effect total drying in a distinct phase and apparatus, it has been identified that an unexpected benefit arises from transitioning from a drying phase to a curing phase when the semi-treated wood contains a moisture content above that desired in the final wood product (314). Since the preferred chemical constituents used in the present process contain relatively high levels of salts, the moisture content determination (unlike the prior art) cannot make use of conductivity measurements in the wood. Instead, the controller (32) effects monitoring of the total mass of removed water and the water take-out rate (as measured by the measurement device (242)) and, upon reaching a predetermined percentage of retained moisture, generally in the range of about 35% to about 3% and most preferably in the range of about 20% to about 10%, the controller (32) initiates the curing phase.

Curing is achieved by elevating the temperature up to about 140° C., but generally to at least 100° C. and certainly to a point at which polymerization is initiated (i.e. greater than about 80° C.), over a pre-set period of time. The temperature increase follows a predetermined profile set by data related to the wood species (as reflected by accumulated data in the database (34)). Typically, to avoid subjecting the semi-treated wood (214) to unnecessary thermal stresses, the controller (32) causes an increase in temperature over about a 4-hour timeframe. The increase in temperature preferably follows a linear relationship with time period, although other profiles may be employed.

In relation to pressure, the curing stage also sees a contemporaneous increase in the pressure within the drying and curing chamber (204). Pressure control is generally regulated by the controller (32), vacuum pump (232) and through steam control (from the heat source (230)) and inferred evaporation rates as monitored and/or inferred from data provided by the various sensors and detectors associated with the drying and curing chamber (204). Over about a four hour period (or other predetermined time), the pressure inside the drying and curing chamber (204) is designed to reach a pressure corresponding to atmospheric pressure. In a similar fashion to temperature profile increases, the pressure can also follow a predetermined profile that provides a generally uniform rate of increase with time or a varying degree of increase with unit time.

Whilst the foregoing explains that, during the curing stage, it is preferable to avoid an under-pressure, it will be understood that the control and monitoring processes described herein can be employed in circumstances where part of the drying cycle occurs above or at atmospheric pressure.

Curing can therefore be considered, in general terms, to differ from drying by virtue of the relatively high rate of polymerization of the monomer that occurs within the wood, whereas drying relates to the removal of water. Of course, towards the end of the curing process, polymerization rates decrease, but at this point the amount of retained monomer is low and the amount of polymerized wood high.

Whilst a preferred embodiment makes use of an atmospheric pressure/curing chamber (204), it is contemplated that a pressurised system might also be used. In this respect, after an initial low pressure phase, an over pressure (of up to about 0.4 Mpa=4 bar) may be applied at least during curing. To maintain acceptable drying and/or curing rates in an over-pressure environment, temperatures are modified under processor control.

At a point in time when the controller (32) preferably determines that the moisture content in the wood has reached a predetermined, desired level at which point curing is deemed to be complete and the finished wood (314) can be removed from the system for quality analysis and inspection. For example, the controller (32), with reference to one or more of: i) historical wood species treatment data; ii) wood thickness data; iii) employed temperature and/or pressure profiles; iv) initial and intermediate wood parameters (such as monomer/oligomer take-up weight and initial weights to determine moisture content); v) detected levels of volatiles or other chemicals components in the atmosphere inside the drying and curing chamber (204); and vi) measured properties or observed characteristics (e.g. knot density, surface finish (including uniformity) or crack length, depth or density) in the samples of finished wood (314), operates to control the current and/or future drying and/or curing phases of the process.

As one example, given the measured properties or observed characteristics determined (for example, by detector (270)) in finished wood (314), closed loop feedback control is performed by the controller (32) to cause the selection of the monomer (and particularly its concentration). Furthermore, such measured properties or observed characteristics are uploaded into the database (34) to produce an historical, cross-correlated record reflecting imposed and effective processing criteria for species of wood having different dimensions.

Figure 3A:
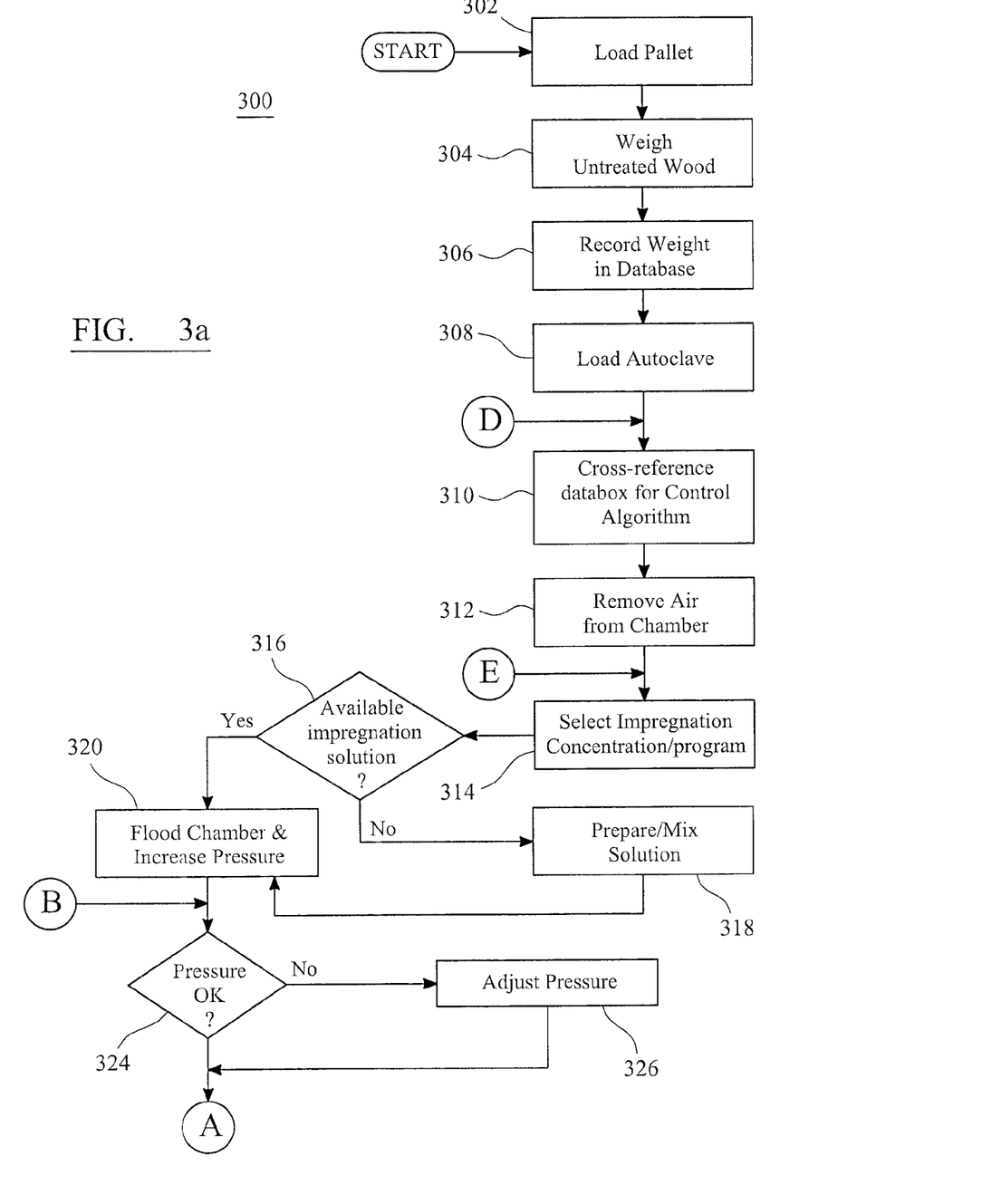
Figure 3B:
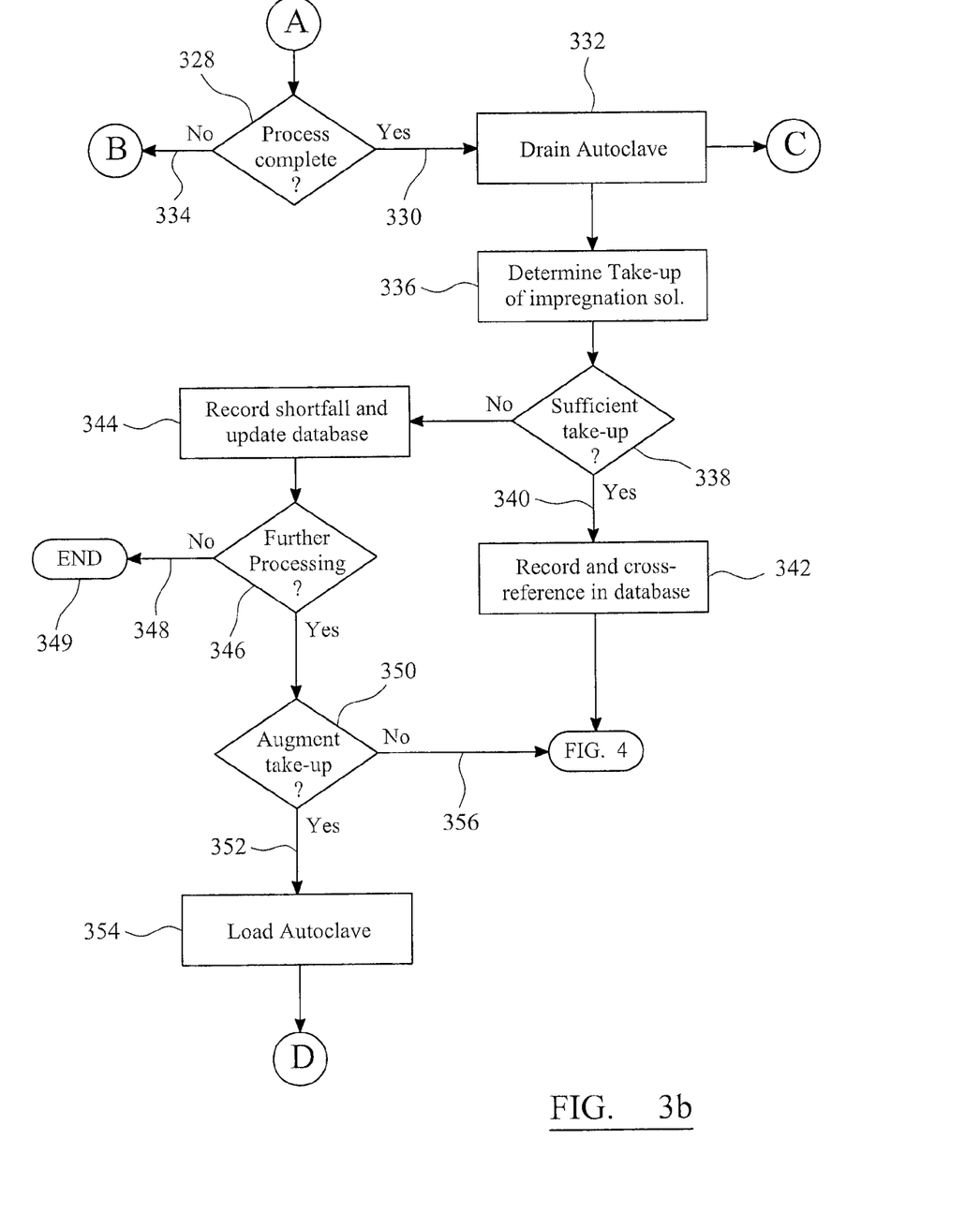
Figure 3C:
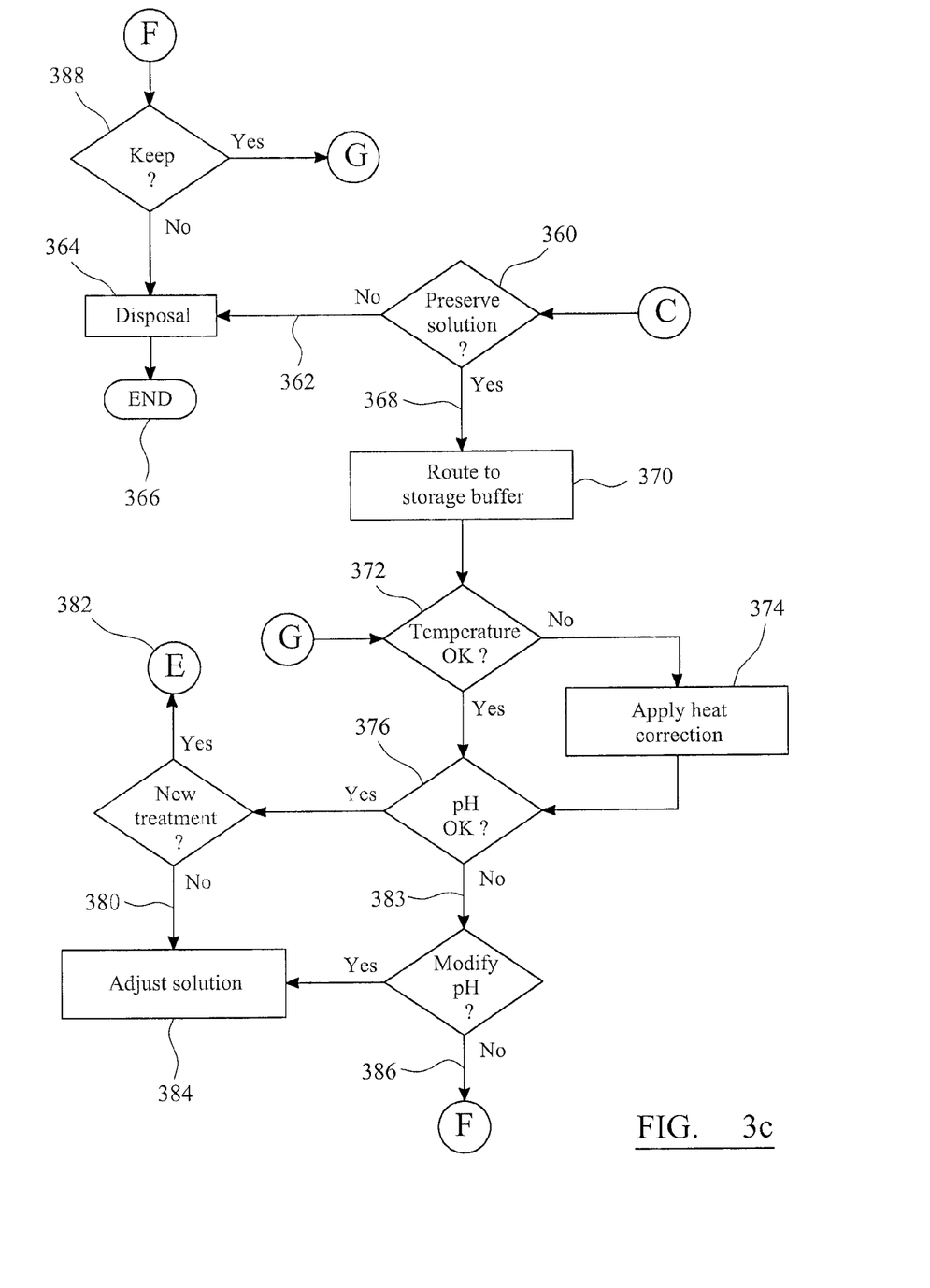

Referring to FIG. 3 (composed from FIGS. 3a to 3c), a flow diagram (300) of a preferred end-to-end wood impregnation process is shown.

The process begins at step (302) where untreated wood (14) is loaded on a pallet or the like. A determination of weight of the untreated wood is made at (304), whereafter the wood species type and batch weight are recorded (306) in database (34) for subsequent use and cross-referencing purposes. The pallet is loaded in the autoclave (308). At steps (310) and (314), the controller (32) preferably operates to select a control algorithm based on wood type, thickness and weight (i.e. implied moisture content). The door of the autoclave is then closed and the vessel is sealed to permit the removal of air at step (312). Based on the selected control program (which may include temperature control), the controller assesses (316) whether a suitable impregnation solution already exists and either causes the mixing/preparation (318) of an appropriate impregnation solution and/or affects the flooding (320) of the autoclave with the appropriate impregnation solution until a stipulated level has been reached whereafter the flow path closed. For impregnation, an over-pressure is generated (322) and maintained under the control of the controller (32).

During the process, continuous checking (324) of the pressure in the autoclave is undertaken. In the event that the pressure falls, appropriate correction is applied by pressure adjustment (326) (preferably with a separately controllable pump, e.g. a frequency controlled pump). At a given point determined by the selected control algorithm, the controller assesses that the impregnation process is complete (steps (328) and (330)); the autoclave is then drained (332) and the pallet tilted (if desired to effect run off of excess surface lying impregnation solution). If the process has yet to reach the criteria or trigger point determined (step (334)) by the control algorithm, monitoring continues, i.e. the process loops back to level control step (324).

Once the autoclave has been drained, a vacuum may optionally be applied to extract excess impregnation solution that has not been locked up within the cells of the wood. The now partially treated batch of wood (214) is then subjected to an impregnation solution take-up determination (steps (336) and (338)), e.g. weight measurement. If sufficient take-up has deemed to have occurred (step (340)), the weight of the partially-treated wood is recorded (342) against a batch identifier and cross-referenced against and into the database (34). The process may then move to the subsequent drying and curing phases of FIG. 4. In the event that a short-fall in the take-up of impregnation solution is observed or determined, the controller records the short-fall and updates (344) the database. A decision is then made as to whether further processing is required (step (346)). If inappropriate (348), the process ends (349), otherwise the controller (32) can be arranged to assist in making an assessment (350) (based on, amongst things, historically recorded process results for similar wood types and wood dimensions) as to whether is it necessary to augment the initial take-up of impregnation solution. In the affirmative (352), the batch of wood is reloaded (354) into the autoclave and impregnation processing re-commences (at step (310)). In the negative (356), the take-up is adjudged to be within an acceptable tolerance, although subsequent drying and curing steps may be modified by the controller (in its selection of the control process) to provide some form of post-impregnation compensation.

With the draining (332) of the autoclave, the controller (32) preferably is programmed automatically to make a decision (360) on whether to preserve the drained impregnation solution (60). In the negative (362), the impregnation solution may be sent for disposal (364) and the process ends (366). In the affirmative (368), the now-used impregnation solution is routed (370) to the storage buffer. Once stored, the temperature of the impregnation solution is monitored (372) and, if necessary, adjusted by applying a heat correction (374). Likewise, the pH is monitored (376). If the pH is acceptable, then storage remains within this temperature-pH control loop (380) until such time as the controller (32) triggers a call for the re-use of the impregnation solution in the autoclave (step (382)). In the event that the pH requires modification/adjustment (383), buffering or initiator chemicals are introduced (384) into the storage buffer under the control of the controller (32) and the storage loop returns to temperature measurement (372). For example, pH adjustment can be realised by producing small volumes of new impregnation solution having a pH, when combined, balances the overall pH in the storage buffer (76). In the event that it is inappropriate (386) to modify the pH, a decision (388) is made as to whether to keep the current impregnation solution (at which point temperature control loop begins at step (372)) or otherwise to dispose of the solution (step (364)).

Figure 4A:
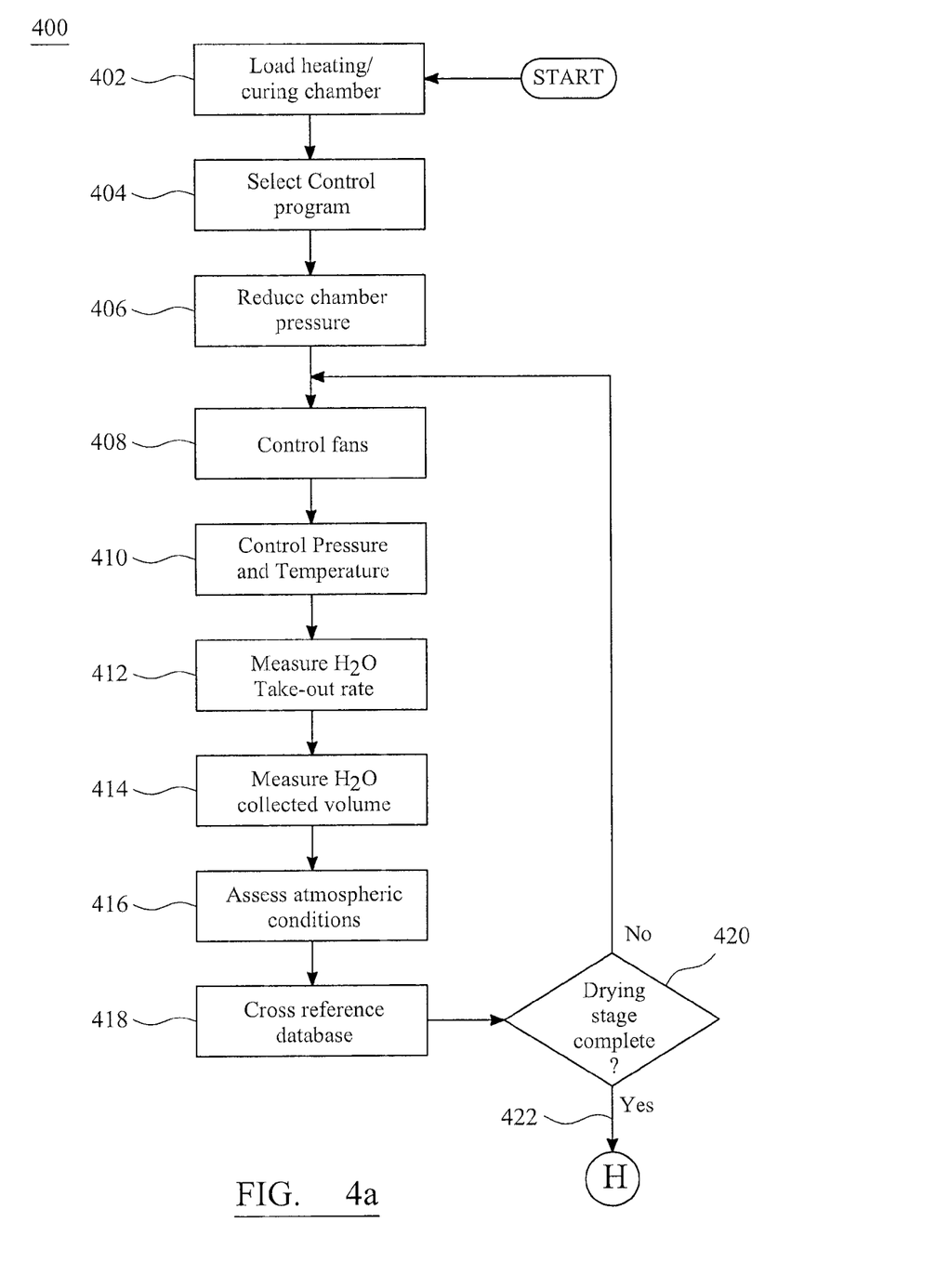
FIGS. 4a and 4b in combination are a flow diagram of a preferred control protocol for the drying and curing sub-system of FIG. 2.
Figure 4B:
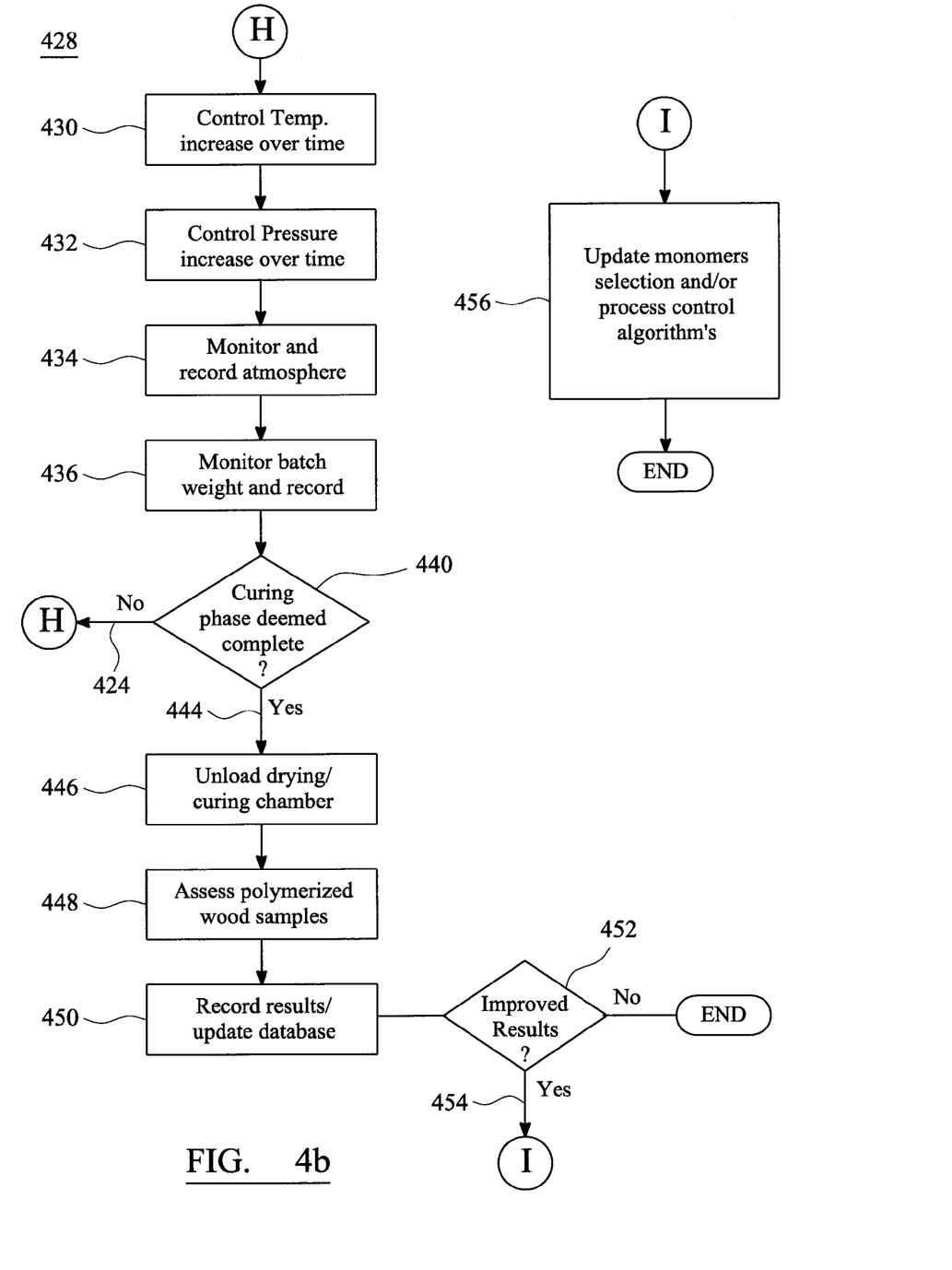

FIGS. 4 (composed of FIGS. 4a and 4b) is a flow diagram (400) of a preferred control protocol for the drying and curing sub-system of FIG. 2.

In relation to the initial drying phase, the drying and curing chamber is loaded (402) and a suitable control program selected (404) by the controller (32). Once loaded, the controller (32) reduces (and then actively controls) pressure in the chamber by causing selective evacuation (406) of air. The controller (32) also exercises the regulation of fan control (408) and temperature control (410) and also monitors (412-414) water take-out rates (in at least the top condensate) and overall water removal volume to infer drying times and drying stages. In effect, the controller (32) operates indirectly to control "relative humidity" by directly controlling pressure and temperature. Relative humidity, in this context, is understood to be the actual instantaneous pressure in the chamber relative to the saturation pressure at the current temperature in the chamber.

Optionally, the controller (32) may also monitor (4168) atmospheric conditions or rates of change in these conditions to infer drying or overly aggressive treatment to permit the scaling of temperature conditions and profiles within the chamber. Throughout the monitoring processes, measurements are recorded (418) and referenced to both the wood batch identity and historical data for corresponding wood species and corresponding dimensional parameters to permit refinement and/or optimisation of current or subsequent batch processing.

At step (420), the controller (32) (given the measured data, historical information and selected control algorithm) assesses whether the drying stage is complete (420) (e.g. a predetermined moisture content has been reached within the batch of impregnated wood) and either (in the affirmative (422)) moves to the curing phase (FIG. 4b) or otherwise remains within the heating control loop (step (408) onwards).

In entering the curing phase (428), the controller functions to control (increasing) temperature and pressure over time (steps (430) and (432)). Optionally, the controller (32) can make use of the sensor/detector (250) to monitor (434) prevailing and changing atmospheric chemical or moisture loading. Additionally, while previously discussed, temperature sensors may be included within the layers of wood to determine local temperature and, based on these temperatures, fan rates or flow patterns produced by the fans (222) may be controlled by the controller (32). The controller (32) also operates to receive batch weight measurements (436). Again, received data is stored and recoded in database (34) to augment historical data and to provide a basis for assessing the state of curing.

At step (440), the controller (32) makes an assessment as to whether the curing phase is complete and, in the negative (424), continues to operate in the aforedescribed control loop. If curing has been deemed (444) to have occurred, the drying and curing chamber is unloaded (446) and the samples of furfurylated wood assessed (448) for effective polymerization. As previously indicated, the assessment can take a number of forms, including: i) weight determination (used, for example for implying residual moisture contents); ii) optical analysis (for crack density or knot density or cellular impregnation levels); iii) chemical analysis to determine (for example) residual, unreacted monomer/oligomer and the presence of volatiles; and/or iv) measurements of other physical attributes, including achieved hardness and detected distortion, such as bending or cupping. Results from this analysis are recorded (450) in the database (34) and referenced to the batch number.

The controller (32) may then be used to assess (452) whether the current treatment process yields improved or unexpected overall results for the final wood (314) and, in the affirmative (454), the control programs may be optionally updated with modified procedures (456) that have a basis in historically or recent impregnation and drying and curing phases. For example, based on the determined properties in the finished wood (314), the controller (32) may update monomer/oligomer selection protocols to cause: i) the selection of a different monomer/oligomer or different concentration; ii) the use of different pressure and/or temperature profiles in the different phases of production; iii) the use of different process times for the various impregnation, drying and curing phases, including transition points in the treatment of a related batch of wood. In this way, the operating methodology may vary with time and the system, if fully automated, is self-adapting. At the very least, the final assessment (452) can be used to generate an alert to a user of the system to consider process change based on comparative results for the present batch and historically stored results.

It will, of course, be appreciated that the above description has been given by way of example only and that modifications in detail may be made within the scope of the present invention. For example, in relation to the overall process, it will be appreciated that certain sub-steps within the ostensibly independent phases of impregnation, drying and curing can be omitted or re-ordered or run in parallel with other steps without impacting the overall result of the process. As another example, the use of load cells on pallets permits the in-chamber measuring of batch weight during the drying and curing phases and thus permits for accurate and instantaneous moisture content determination.

As another example, while the preferred embodiment describes a separate database, it will be appreciated that this could be realised by cached memory on an integrated chip or otherwise as RAM in an operational computer. Any reference to "database" or memory should therefore be construed to be functional in that the database represents a memory storage area in which process control programs can be stored and in which current and historical process data (as appropriate) can be collected and correlated. Similarly, while a preferred embodiment describes a controller, the skilled person will appreciate that the controller can be realised by program code that can be provided in a number of executable forms, such as a computer program product or memory stick for downloading into a conventional computer. Of course, mechanical control features, such as valves and detectors, will need to be interfaced appropriately into a complete system with such integration readily understood by the skilled addressee.

The monitoring and control process (for the drying and curing phases) may be supplied in the form of a computer program product, such as on a computer readable memory device.

The term "monomer/oligomer" is to be construed broadly to include the compounds, solutions, mixtures and condensation products of monomer and oligomers that produce furfurylated wood products, including furfuryl alcohol, bishydroxy methyl furan, trihydroxy methyl furan, oligomers and condensation products of these compounds and mixtures thereof. The broad construction is warranted on the basis that the process of the present invention is more generally applicable and the benefits derived from the process are not limited to particular concentrations or compositions. For example, the present invention can also make use of so-called "BioRez" solutions.

While not wishing to be bound by theory, the inventors note that, in the post-impregnation treatment stages of drying and curing, there is some limited amount of overlap when both drying and curing occur together (even at relatively low temperatures). Similarly, in the stage that is predominantly ascribed as "curing", some drying may continue within the wood sample. However, as described above and as will be appreciated, the processes are to some extent discrete in that the atmospheric and temperatures conditions drive one of the drying or curing processes as being dominant (having particular regard to elapsed processing time of the sample within the drying and curing chamber (204)).

Unless the specific context describes otherwise (e.g. the processes and systems are inherently incompatible), the various preferred embodiments of the present invention can be employed in an isolated or cumulative basis. For example, scanning of polymerized wood and the control of future batch processing in, especially, the drying and curing chamber can make use of data acquired from untreated wood samples (and typically untreated wood samples of the same wood genus and the same dimensions), but this need not be the case. Conversely, the processing may be controlled based merely on qualitative or quantitative assessment of individual or averaged final properties and appearance of similar wood batches.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of controlling production of polymer-impregnated wood, the method comprising: i) monitoring: a) an environment of a combined drying and curing chamber to determine changes in at least one of chemical out-gasing in that environment or water extracted from impregnated wood in that environment; and b) characteristics in polymer-impregnated wood that have been subjected to curing within a combined drying and curing chamber to determine changes in properties arising from differing processing conditions applied to different batches of chemically-impregnated wood; ii) based on determined changes in the monitoring step and by referencing historically stored information recorded for prior batch production of polymer-impregnated wood, altering processing conditions in the combined drying and curing chamber to vary with time a trigger point responsible for a process transition between one or more of drying and curing phases and curing phase completion for polymer-impregnated wood in production in the combined drying and curing chamber; iii) against a batch identifier reflecting a wood species type and a dimensional measure recording: a) a change in the atmospheric environment in the chamber arising with respect to time: b) a change in applied processing conditions arising over time with respect to different batches of wood and c) a difference in a characteristic in the polymer-impregnated wood from each batch; iv) selecting processing conditions for a future batch of untreated wood by referencing desired characteristics for polymer-impregnated wood against historically accumulated processing conditions for a similar wood species type and dimensional measures of the untreated wood.

2. The method of controlling production of polymer-impregnated wood according to claim 1, further comprising: contrasting untreated wood and post-cured wood to determine properties and process parameters that affect the production of polymer-impregnated wood; and based on the contrast and the determined properties, adapting processing conditions applied in at least one of the drying and caring phases for future batches of wood.

3. The method of controlling production of polymer-impregnated wood according to claim 1, wherein said altered processing conditions are further selected from a group including at least one of: a) a temperature profile in at least the drying and curing chamber; b) a pressure profile in at least the drying and curing chamber; and c) a chemical composition of an impregnation solution used to produce the polymer-impregnated wood.

4. A wood-treatment plant comprising: a combined drying and curing chamber arranged, in use, to treat chemically-impregnated wood at controlled pressures; a monitoring sub-system coupled to a drying and curing chamber, the monitoring sub-system generating, in use, data reflecting at least one of: a) environment conditions in the combined drying and curing chamber; and b) characteristics of polymer-impregnated wood that has been subjected to curing within the combined drying and curing chamber; a database for storing data generated by the monitoring sub-system; and a controller coupled to the combined drying and curing chamber and the database the controller exercising operational control over wood treatment processing in at least the combined drying and curing chamber in response to data from the monitoring sub-system, and wherein the controller is arranged, in use, to: i) identify with reference to collated data in the database at least one of: a) a change in chemical out-gasing in the combined drying and curing chamber or water extracted from impregnated wood loaded in the combined drying and curing chamber b) a change in a property arising from a differing processing condition applied to different batches of chemically-impregnated wood; and ii) based on determined changes in the monitoring sub-system and by referencing historically stored data stored in the database for prior batch production of polymer-impregnated wood, altering processing condition in the combined drying and curing chamber to vary with time a trigger point responsible for process transitions between at least one of drying and curing phases and curing phase completion for polymer-impregnated wood in production in the combined drying and curing chamber.

5. The wood-treatment plant according to claim 4, wherein the controller is further arranged to alter, in the combined drying and curing chamber in response to data from the monitoring sub-system, processing conditions selected from at least one of a) a temperature profile in at least the drying and curing chamber; b) a pressure profile in at least the drying and curing chamber; and c) a chemical composition of an impregnation solution used to produce the polymer-impregnated wood.

6. The wood-treatment plant according to claim 4, wherein the combined drying and curing chamber includes one or more fans that are operationally responsive to the controller and wherein the controller regulates the fan's operation to compensate for varying pressure levels during the heating and curing phases.

7. The wood-treatment plant according to claim 4, further including a pressure sensor coupled to the controller and a steam generator operationally responsive to the controller.

8. The wood-treatment plant according to claim 4, further including an autoclave that, in use, receives batches of wood for impregnation with impregnation solution, the impregnation solution controllably delivered to a sealable pressure vessel under control of the controller, wherein the combined drying and curing chamber is physically distinct from an autoclave.

9. A wood-polymer impregnation process controller including an associated memory that stores wood treatment program code that, in use, is executed by the controller to: control a temperature profile in at least a combined drying and curing chamber; control a pressure profile in at least the combined drying and curing chamber; control a trigger point responsible for process transition between at least one of drying and curing phases and curing phase completion in the combined drying and curing chamber during current production and polymer-impregnated wood; and control a chemical composition of an impregnation solution used to produce chemically-impregnated wood; the controller further arranged to identify, with reference to historically accumulated production parameter data acquired for earlier production batches and stored in the memory, at least one of: a) a change in chemical out-gasing in the combined drying and curing chamber or water extracted from impregnated wood in the combined drying and curing chamber; b) a change in properties arising from differing processing conditions applied to different batches of chemically-impregnated wood; and wherein the controller is arranged to execute code that alters, in response to interpretation of the stored data, processing conditions to vary with time the trigger point in the combined drying and curing chamber.

10. The wood-polymerization process controller according to claim 9, the controller executing, in use, code that is arranged: to assign and store a batch identifier reflecting a wood species type and dimensional measure: to record a change in an atmospheric environment within the drying and curing chamber arising with respect to time; to record a change in applied processing conditions arising over time with respect to different batches of wood; to record a difference in a characteristic in polymerized wood from each batch; and to select a processing conditions for future batches of untreated wood by referencing desired characteristics for polymerized wood against historically accumulated processing conditions, stored in memory, for similar wood species type and dimensional measures of the untreated wood.

11. The wood-polymerization process controller according to claim 9, wherein the controller operates, in use, to control a pressure profile in the drying and curing chamber from between about 0.1 bar to about ambient pressure.

12. The method of controlling production of polymer-impregnated wood according to claim 1, further comprising: polymerizing monomer/oligomer-impregnated wood in the combined drying and curing chamber to produce a finished wood product having a desired moisture content, the method further comprising: determining a take-up of impregnation solution and a relative moisture content within a batch of impregnated wood to be polymerized; initiating a drying phase under a controlled pressure condition within the combined drying and curing chamber; monitoring at least one of water removal from the combined drying and curing chamber and an atmospheric environment in the drying and curing chamber; and transitioning to a curing phase at a process point prior to attaining the desired moisture content, the process point determined by at least one of the water removal and changing conditions in the atmospheric environment and wherein the curing phase requires a controlled increase in temperature in the combined drying and curing chamber over a predetermined period of time.

13. The method of controlling production of polymer-impregnated wood according to claim 12, wherein transitioning to the curing phase requires a controlled increase in both temperature and pressure.

14. The method of controlling production of polymer-impregnated wood according to claim 12, wherein transitioning to the curing phase from the drying phase occurs at a moisture content level in monomer/oligomer-impregnated wood of between about 35% and 3%, more preferably between about 20% and 6% and most preferably between 6% and 10%.

15. The method of controlling production of polymer-impregnated wood according to claim 14, wherein at least one of the drying and curing phases occurs at a reduced pressure relative to atmospheric pressure.

\* \* \* \* \*